United States Patent Office 2,735,225
Patented Feb. 21, 1956

2,735,225
PYRIMIDINES AS PLANT RESPONSE SUBSTANCES

Lyle D. Goodhue and John E. Mahan, Bartlesville, Okla., assignors to Phillips Petroleum Company, a corporation of Delaware No Drawing. Application September 14, 1951,
Serial No. 246,710

16 Claims. (Cl. 47—57.5)

This invention relates to the use of selected pyrimidines as plant growth regulating agents. In one aspect this invention relates to a method for regulating the growth of plants. In another aspect this invention relates to a composition for modifying the growth of plants.

The art of modifying plant growth has in recent years been centered around the discovery of so-called plant hormones. Many materials have been discovered which when applied to plant structure in minute amounts act as a stimulus to development of the plant. Simple chemical compounds that are easily synthesized have been found which stimulate root growth, which stimulate seed germination, and which in other ways modify the growth characteristics of plants.

We have now discovered that substituted pyrimidines such as 4-phthalimido-2,6-dimethylpyrimidine have plant growth modifying properties and can be applied in different manners to modify the growth characteristics of plants in various ways.

The pyrimidines which are applicable as plant response materials in accordance with the present invention are represented by the general formula $$\begin{array}{c} R \quad R \\ | \quad | \\ C=C \\ / \quad \backslash \\ N \quad C-R \\ \backslash \quad // \\ C-N \\ | \\ R \end{array}$$

wherein the R's can be hydrogen, alkyl radicals containing not more than 6 carbon atoms, aryl radicals, substituted aryl radicals, halogen atoms, but at least one of the R's must be a substituted amino radical

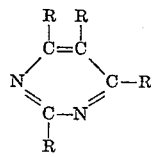

or

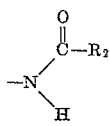

or

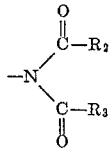

or

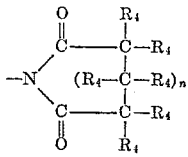

or

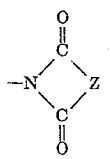

wherein $R_2$ and $R_3$ can be alkyl radicals containing not more than 6 carbon atoms, aryl radicals, or alkaryl radicals; $R_4$'s can be hydrogen, or alkyl radicals containing not more than 2 carbon atoms; $n$ can be an integer from 0 to 2; and Z can be phenylene, dihydrophenylene, tetrahydrophenylene, hexahydrophenylene, or halogen, nitro, hydroxyl, alkoxy or alkyl substituted phenylene groups.

Typical compounds of the present invention include 4-phthalimido-2,6-dimethylpyrimidine; 4-acetamido - 5 - chloro-2,6-dimethylpyrimidine; 4-acetamido-5-chloro-2,6-diethylpyrimidine; 4-benzamido-2,6-dimethylpyrimidine; 4-succinimido-2,6-dimethylpyrimidine; dichlorotetrahydrophthalimido-2,6-dimethylpyrimidine; tetrachlorotetrahydrophthalimido-2,6-dimethylpyrimidine; 4-nitrophthalimido-2,6-dimethylpyrimidine; 3-hydroxyphthalimido-2,6-dimethylpyrimidine; 3-bromophthalimido-2,6-dimethylpyrimidine; 4,5-dimethylphthalimido-2,6 - dimethylpyrimidine; 4-methylphthalimido-2,6-dimethylpyrimidine and the like.

The materials of the present invention can be prepared by the interaction of aminopyrimidines with phthalic anhydride or other organic acid anhydride. The preparation of 4-aminopyrimidines by the polymerization of nitriles in the presence of relatively small amounts of a metal hydride catalyst is described in copending application Serial No. 196,719 filed November 20, 1950, by John E. Mahan et al.

It has been found that these materials greatly retard and malform terminal growth on broad-leafed plants. The leaves form thick leathery rosettes. They cause bending and curling of stems and when sprayed on soil they depress the growth of lateral roots. At lower dosages these materials are potentially useful for preventing fruit drop, increasing fruit set, reducing the sprouting of tubers, causing cuttings to root and many others.

In the application of the present compounds for various purposes, different compositions can be employed. Since they are only slightly soluble in water, aqueous suspensions will usually be found most desirable. These suspensions can include wetting agents or adhesives or both. Colloidal materials such as the soluble gums or resins can be included; also, water-soluble polymers such as polyvinyl alcohol. The compounds also can be applied in admixture with other diluents either as pastes or dusts. Thus the materials can be incorporated in oils, fats, or similar vehicles such as lanolin, or in a finely divided inert solid such as talc, flour, fuller's earth, clay or other finely divided solids. They can also be used in the form of solutions in suitable solvents. In some instances it may be desirable to employ mixtures of these compounds with other plant growth regulating agents or the like.

EXAMPLE I

*Petri dish tests with 4-phthalimido-2,6-dimethylpyrimidine on sprouting seeds*

Several types of seed including beans, cotton, cucumber, wheat, barley and others were employed in the petri dish test to determine the plant growth regulating effects of 4-phthalimido-2,6-dimethylpyrimidine. The petri dish tests were conducted as follows: A piece of 9 cm. filter paper was placed in a 10 cm. petri dish. A small amount of the chemical (10 mg. or less) was placed in the center of the paper in the form of a 1 per cent solution in acetone. The tests were set up at three dosages, 10 mg., 1.0 mg., and 0.1 mg. The solution spreads through the paper giving good distribution. Although this compound is only slightly soluble in water (20 p. p. m.), it is apparently soluble enough to furnish an effective concentration. The acetone was allowed to evaporate completely and then ten select quality seeds were arranged in a circle around the center of the paper and 5 to 6 cc. of water added. The dishes were covered and placed in an incubator at 70° F. for the seeds to sprout. Observations were made at intervals and the final results were recorded at the end of one week. The growth is expressed as a ratio of the growth in the check (no chemical) and notes on other effects are taken. Results of tests using beans, cotton, cucumbers, radishes, mustard, sunflowers, peas, rice, wheat, and barley are recorded in Table I.

TABLE I.—PETRI DISH TESTS WITH 4-PHTHALIMIDO-2,6-DIMETHYLPYRIMIDINE ON SPROUTING SEEDS

| Kind of Seed | Growth Rates at Indicated Dosage | | | | | | Remarks |
|---|---|---|---|---|---|---|---|
| | 10 mg. | | 1.0 mg. | | 0.1 mg. | | |
| | Stem | Root | Stem | Root | Stem | Root | |
| Beans | 0 | .2 | 0 | .2 | 0 | .8 | Inhibits lateral roots. |
| Cotton | 1.0 | .2 | 1.0 | .8 | 1.0 | 1.0 | Causes curling. |
| Cucumbers | 0 | .05 | .7 | .5 | 1.0 | 1.0 | |
| Radishes | 0 | .05 | .5 | .5 | .8 | .8 | Inhibits lateral roots. |
| Mustard | 0 | 0 | .3 | .3 | .5 | .5 | |
| Sunflowers | .1 | .1 | .1 | .8 | .1 | .7 | |
| Peas | .05 | .2 | .5 | .2 | .8 | 1.0 | Forms club roots. |
| Rice | .05 | 0 | .7 | .7 | 1.0 | 1.0 | |
| Wheat | .1 | .05 | .5 | .1 | 1.0 | 1.0 | |
| Barley | .05 | 0 | .7 | .3 | 1.0 | 1.0 | |

From the table it appears that cotton is affected less than the others. Beans and mustard were most strongly affected. Except for cotton, most of the sprouting seeds grew very little at a dosage of 10 mg. of the hormone per petri dish. Sunflowers, mustard, and beans were inhibited most at the lowest dosage, 0.1 mg. per petri dish.

EXAMPLE II

Soil tests

A test was conducted to determine the effect of 4-phthalimido-2,6-dimethylpyrimidine on seeds sprouting in soil. Potting soil was dried and pulverized in a ball mill. Sixty gram portions were weighed into wide-mouthed jars and treated with 0.6 g. of 4-phthalimido-2,6-dimethylpyrimidine thus providing soil containing 1 per cent of the chemical. This 1 per cent soil was subsequently mixed in additional potting soil in a pebble mill to provide varying dosages of the chemical. The chemical was first dissolved in 30 cc. of acetone and mixed thoroughly with the soil. The acetone was removed by allowing the treated soil to stand overnight in the open jars. The soil was ground with a pestle in the jar before it was used. Seeds such as beans, cotton, cucumber and others were then planted in 4 inch flower pots and covered with treated soil. Observations were made as the plants grew under simulated greenhouse conditions. The highest dosage was 100 mg. per pot which approximated 100 pounds per acre. The succeeding dosages were 50 mg., 25 mg., 12 mg., and 6 mg. per pot. Results on beans, cotton, cucumbers, radishes, tomatoes, peas, and wheat are shown in Table II.

TABLE II.—SOIL TESTS WITH 4-PHTHALIMIDO-2,6-DIMETHYL-PYRIMIDINE ON SPROUTING SEEDS

| | Effect after 21 days at Indicated Dosages | | | | |
|---|---|---|---|---|---|
| | 100 mg. | 50 mg. | 25 mg. | 12 mg. | 6 mg. |
| Beans | no growth | no growth | no growth | 1 showing | {1 up. {1 showing. |
| Cotton | severe | slight | normal | normal | normal. |
| Cucumbers | do | moderate | moderate | moderate | Do. |
| Radishes | very severe | do | do | slight | Do. |
| Tomatoes | moderate | do | slight | normal | Do. |
| Peas | very severe | very severe | moderate | slight | Do. |
| Wheat | severe | moderate | do | do | Do. |

The effects listed in the table are more fully defined as follows:
*Very severe.*—Plant growth was 10 percent or less, of check growth. 10 percent or less of the number of seeds planted emerged from soil as plants. Plants were badly bent and malformed and their leaves were smaller and darker green than check plants. Leaves were thick and leathery.
*Severe.*—10 to 25% of check growth. 10 to 25% emerged from soil. Plants were malformed and badly bent.
*Moderate.*—25 to 75% of check growth. 25 to 75% emerged from soil. Plants were malformed and bent.
*Slight.*—75 to 90% of check growth. 75 to 90% emerged from soil. Plants slightly malformed and bent.

Beans were most severely affected. One bean plant finally grew about one-half normal size in the 6 mg. pot and one emerged slightly above the surface of the soil in the 12 mg. pot. Cotton, as in the petri dish tests was affected the least but still a rather severe effect was obtained at 100 mg. per pot. Peas were severely affected. Wheat was severely retarded at the two highest dosages and drops of sap were exuded from the joints. Cucumbers were affected severely at the high dosage. Radishes gave about the same reaction. Tomatoes were also affected according to the dosage. All the comparisons were made with check pots containing no hormone.

EXAMPLE III

Spray application tests

For these tests, plants were grown in pots for about two weeks. The faster growing plants, such as beans, were used younger than the slower growing plants so that all the plants were in the same stage of development when they were sprayed. The different kinds of plants used were beans, peas, clover, peanuts, tomatoes, cotton, wheat, radishes, and cucumbers. One pot of each was sprayed until just wet with a one per cent suspension, one each with a 0.5 per cent suspension, one each with a 0.25 per cent and one each with a 0.12 per cent suspension. The one per cent suspension was prepared by dissolving one gram of the hormone in 20 cc. of acetone and adding one gram of an emulsifier, Atlox 1045A [1], and pouring into 80 ml. of water with rapid stirring. The dilutions were made from this suspension with water. The results are shown in Table III.

TABLE III.—THE EFFECT OF SPRAYING SOME PLANTS WITH SUSPENSIONS OF 4-PHTHALIMIDO-2,6-DIMETHYL-PYRIMIDINE

| Kind of Plant | Effect after 14 days at indicated concentrations | | | |
|---|---|---|---|---|
| | 1.0% | 0.5% | 0.25% | 0.12% |
| Beans | very severe | very severe | severe | severe. |
| Peas | do | severe | do | moderate. |
| Clover | do | do | moderate | slight. |
| Peanuts | severe | moderate | | |
| Tomatoes | very severe | severe | moderate | slight. |
| Cotton | severe | do | do | Do. |
| Wheat | slight | none | none | none. |
| Radishes | very severe | severe | severe | moderate. |
| Cucumbers | do | very severe | do | |

NOTE.—The effect though varying in degree is about the same on all plants. It consists of greatly reduced and malformed terminal growth, killing of leaves in most severe cases, and bending down (epinasty) of leaves and stems. Small leathery leaves are often formed.

[1] Atlox 1045A is the trade name for sorbitan monolaurate polyoxyethylene wetting agent.

As observed in other tests, beans and some other legumes, peas and peanuts, are severely affected. Even the lowest concentration almost stopped the growth of beans. The little growth that did occur was leathery and malformed. Severe bending occurred in peas and peanuts. Tomatoes were severely curled. Cotton was affected at the higher but not at the lower concentrations. Wheat was only slightly affected. Part of the radishes and cucumbers were killed at the higher concentrations and severely affected at lower dosages. The effect is about the same on all broad leafed plants but varies in degree with the species.

EXAMPLE IV

*Miscellaneous tests*

When applied to the stem of a bean plant in lanolin, 4-phthalimido-2,6-dimethylpyrimidine causes bending of the stem and is translocated to disturb normal terminal growth.

In soil it has been observed that root growth is greatly retarded. Very few lateral roots form, also roots often grow up out of the soil instead of down. The stems of water plant of the genus Elodea are caused to curl when growing in dilute solutions (20 p. p. m.) of this hormone.

EXAMPLE V

*Miscellaneous tests*

Young bean plants treated on the stem, petiole and leaf with a lanolin suspension of 4-acetamido-5-chloro-2,6-dimethylpyrimidine showed epinasty (bending) which distinctly indicates hormone activity. Evidence of epinasty was observed on the terminal growth also which indicates the chemical is translocated.

EXAMPLE VI

*Miscellaneous tests*

4-acetamido-2,6-dimethylpyrimidine in lanolin suspension showed mild effects of hormone activity in the form of epinasty when applied to the petioles of young bean plants.

A one per cent suspension of the tested material in lanolin was used in Examples IV, V and VI.

EXAMPLE VII

*Miscellaneous tests*

One week old bean plants were sprayed with a 0.2 per cent aqueous suspension of 4-tetrahydrophthalimido-2,6-dimethylpyrimidine. Terminal growth was inhibited for more than 37 days.

EXAMPLE VIII

*Miscellaneous tests*

Young bean plants having their first leaves were sprayed with a 0.5 per cent aqueous suspension of 4-succinimido-2,6-dimethylpyrimidine. Terminal growth was inhibited for the period of the test, one week. Leaves on untreated bean plants grew 6 inches.

Not all substituted pyrimidines are effective as plant growth regulating agents. Thus 4-amino-2,6-dimethylpyrimidine was applied in lanolin suspension to a bean plant and no effect at all was observed at the end of 10 days.

Reasonable variation and modification are possible within the scope of the disclosure of the present invention, the essence of which is that certain substituted pyrimidines have been discovered to possess plant growth modifying properties when suitably applied and have been used to modify the growth characteristics of various plants.

We claim:

1. A method for modifying the growth of a plant which comprises subjecting the plant, at some period of its growth, to the action of an amount and concentration sufficient to achieve the desired result of a substituted pyrimidine represented by the general formula

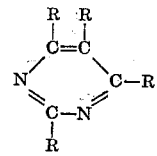

wherein one of the R's is a substituted amino radical selected from the group consisting of

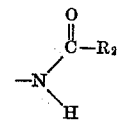

and

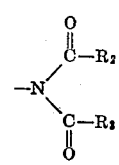

and

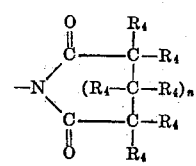

and

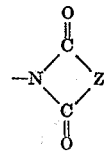

where $R_2$ is selected from the group consisting of an alkyl radical containing not more than 6 carbons, an aryl radical and an alkaryl radical; $R_3$ is selected from the group consisting of an alkyl radical containing not more than 6 carbons, an aryl radical and an alkaryl radical; $n$ is an integer from 0 to 2; $R_4$ is selected from the group consisting of hydrogen and an alkyl radical containing not more than 2 carbon atoms; Z is selected from the group consisting of unsubstituted and substituted phenyl, dihydrophenylene, tetrahydrophenylene and hexahydrophenylene radicals, the substituted radicals containing substituents selected from the group consisting of halogen atoms, nitro radicals, hydroxy radicals, alkoxy radicals and alkyl radicals; and the remaining R's are selected from the group consisting of hydrogen, an alkyl radical containing not more than 6 carbon atoms, an aryl radical, substituted aryl radicals and a halogen atom.

2. A method according to claim 1 wherein the selected compound is sprayed upon the plant as an aqueous emulsion.

3. A method according to claim 1 wherein the selected compound is admixed with a finely divided inert solid and applied as a dust.

4. A method according to claim 1 which comprises making an incision in the plant and applying the selected compound thereto.

5. A method for modifying the growth of plants which comprises applying to the soil in which the plants are to be grown in an amount and concentration sufficient to achieve the desired result a compound selected from the group of substituted pyrimidines represented by the general formula

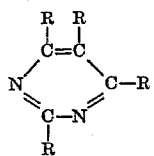

wherein one of the R's is a substituted amino radical selected from the group consisting of

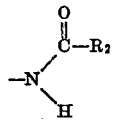

and

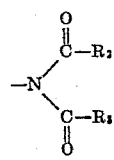

and

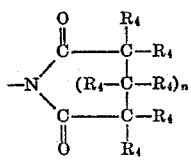

and

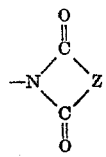

wherein $R_2$ is selected from the group consisting of an alkyl radical containing not more than 6 carbons, an aryl radical and an alkaryl radical; $R_3$ is selected from the group consisting of an alkyl radical containing not more than 6 carbons, an aryl radical and an alkaryl radical; $n$ is an integer from 0 to 2; $R_4$ is selected from the group consisting of hydrogen and an alkyl radical containing not more than 2 carbon atoms; Z is selected from the group consisting of unsubstituted and substituted phenylene, dihydrophenylene, tetrahydrophenylene and hexahydrophenylene radicals, the substituted radicals containing substituents selected from the group consisting of halogen atoms, nitro radicals, hydroxy radicals, alkoxy radicals and alkyl radicals; and the remaining R's are selected from the group consisting of hydrogen, an alkyl radical containing not more than 6 carbon atoms, an aryl radical, substituted aryl radicals and a halogen atom.

6. A method for modifying the growth of plants which comprises applying to the seeds prior to planting in an amount and concentration sufficient to achieve the desired result a compound selected from the group of substituted pyrimidines represented by the general formula

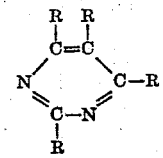

wherein one of the R's is a substituted amino radical selected from the group consisting of

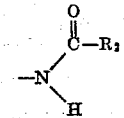

and

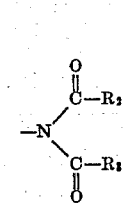

and

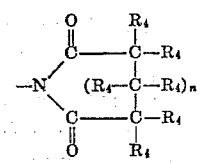

and

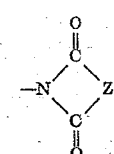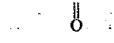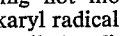

wherein $R_2$ is selected from the group consisting of an alkyl radical containing not more than 6 carbons, an aryl radical and an alkaryl radical; $R_3$ is selected from the group consisting of an alkyl radical containing not more than 6 carbons, an aryl radical and an alkaryl radical; $n$ is an integer from 0 to 2; $R_4$ is selected from the group consisting of hydrogen and an alkyl radical containing not more than 2 carbon atoms; Z is selected from the group consisting of unsubstituted and substituted phenylene, dihydrophenylene, tetrahydrophenylene and hexahydrophenylene radicals, the substituted radicals containing substituents selected from the group consisting of halogen atoms, nitro radicals, hydroxy radicals, alkoxy radicals and alkyl radicals; and the remaining R's are selected from the group consisting of hydrogen, an alkyl radical containing not more than 6 carbon atoms, an aryl radical, substituted aryl radicals and a halogen atom.

7. A method for modifying the growth of a plant which comprises applying to said plant 4-phthalimido-2,6-dimethylpyrimidine in an amount and concentration sufficient to modify the growth of said plant.

8. A method for modifying the growth of a plant which comprises applying to said plant 4-acetamido-5-chloro-2,6-diethylpyrimidine in an amount and concentration sufficient to modify the growth of said plant.

9. A method for modifying the growth of a plant which comprises applying to said plant 4-succinimido-2,6-dimethylpyrimidine in an amount and concentration sufficient to modify the growth of said plant.

10. A method for modifying the growth of a plant which comprises applying to said plant 4-tetrahydrophthalimido-2,6-dimethylpyrimidine in an amount and concentration sufficient to modify the growth of said plant.

11. A method for modifying the growth of a plant which comprises applying to said plant dichlorotetrahydrothalimido-2,6-dimethylpyrimidine in an amount and concentration sufficient to modify the growth of said plant.

12. A plant growth modifying composition which comprises a compound selected from the group of substituted pyrimidines represented by the general formula

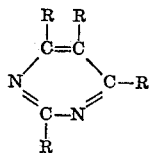

wherein one of the R's is a substituted amino radical selected from the group consisting of

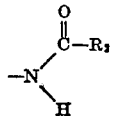

and

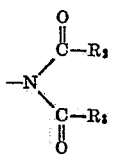

and

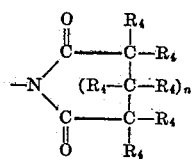

and

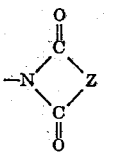

wherein $R_2$ is selected from the group consisting of an alkyl radical containing not more than 6 carbons, an aryl radical and an alkaryl radical; $R_3$ is selected from the group consisting of an alkyl radical containing not more than 6 carbons, an aryl radical and an alkaryl radical; $n$ is an integer from 0 to 2; $R_4$ is selected from the group consisting of hydrogen and an alkyl radical containing not more than 2 carbon atoms; Z is selected from the group consisting of unsubstituted and substituted phenylene, dihydrophenylene, tetrahydrophenylene and hexahydrophenylene radicals, the substituted radicals containing substituents selected from the group consisting of halogen atoms, nitro radicals, hydroxy radicals, alkoxy radicals and alkyl radicals; and the remaining R's are selected from the group consisting of hydrogen, an alkyl radical containing not more than 6 carbon atoms, an aryl radical, substituted aryl radicals and a halogen atom dissolved in oil and suspended in water in a concentration sufficient to modify the growth of plants.

13. A plant growth modifying composition which comprises a phytocidal concentration of a compound selected from the group of substituted pyrimidines represented by the general formula

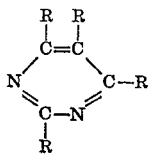

wherein one of the R's is a substituted amino radical selected from the group consisting of

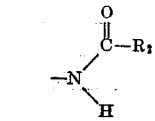

and

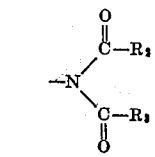

and

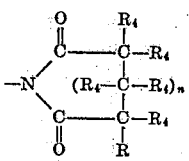

and

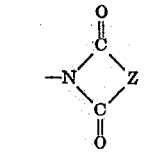

wherein $R_2$ is selected from the group consisting of an alkyl radical containing not more than 6 carbons, an aryl radical and an alkaryl radical; $R_3$ is selected from the group consisting of an alkyl radical containing not more than 6 carbons, an aryl radical and an alkaryl radical; $n$ is an integer from 0 to 2; $R_4$ is selected from the group consisting of hydrogen and an alkyl radical containing not more than 2 carbon atoms; Z is selected from the group consisting of unsubstituted and substituted phenylene, dihydrophenylene, tetrahydrophenylene and hexahydrophenylene radicals, the substituted radicals containing substituents selected from the group consisting of halogen atoms, nitro radicals, hydroxy radicals, alkoxy radicals and alkyl radicals; and the remaining R's are selected from the group consisting of hydrogen, an alkyl radical containing not more than 6 carbon atoms, an aryl radical, substituted aryl radicals and a halogen atom; and a polyvinyl alcohol and water.

14. A plant growth modifying composition which comprises a phytocidal concentration of a compound selected from the group of substituted pyrimidines represented by the general formula

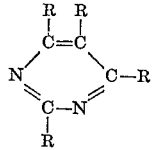

wherein one of the R's is a substituted amino radical selected from the group consisting of

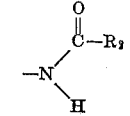

and

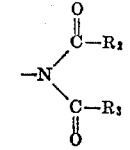

and

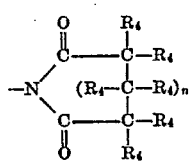

and

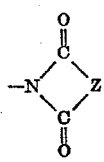

wherein $R_2$ is selected from the group consisting of an alkyl radical containing not more than 6 carbons, an aryl radical and an alkaryl radical; $R_3$ is selected from the group consisting of an alkyl radical containing not more than 6 carbons, an aryl radical and an alkaryl radical; $n$ is an integer from 0 to 2; $R_4$ is selected from the group consisting of hydrogen and an alkyl radical containing not more than 2 carbon atoms; Z is selected from the group consisting of unsubstituted and substituted phenylene, dihydrophenylene, tetrahydrophenylene and hexahydrophenylene radicals, the substituted radicals containing substituents selected from the group consisting of halogen atoms, nitro radicals, hydroxy radicals, alkoxy radicals and alkyl radicals; and the remaining R's are selected from the group consisting of hydrogen, an alkyl radical containing not more than 6 carbon atoms, an aryl radical, substituted aryl radicals and a halogen atom; and a finely divided inert solid.

15. A plant growth modifying composition which comprises a phytocidal concentration of a compound selected from the group of substituted pyrimidines represented by the general formula

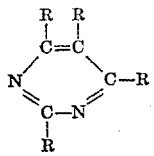

wherein one of the R's is a substituted amino radical selected from the group consisting of

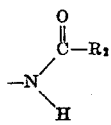

and

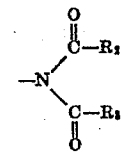

and

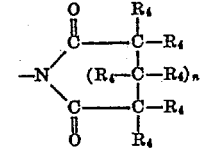

and

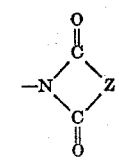

wherein $R_2$ is selected from the group consisting of an alkyl radical containing not more than 6 carbons, an aryl radical and an alkaryl radical; $R_3$ is selected from the group consisting of an alkyl radical containing not more than 6 carbons, an aryl radical and an alkaryl radical; $n$ is an integer from 0 to 2; $R_4$ is selected from the group consisting of hydrogen and an alkyl radical containing not more than 2 carbon atoms; Z is selected from the group consisting of unsubstituted and substituted phenylene, dihydrophenylene, tetrahydrophenylene and hexahydrophenylene radicals, the substituted radicals containing substituents selected from the group consisting of halogen atoms, nitro radicals, hydroxy radicals, alkoxy radicals and alkyl radicals; and the remaining R's are selected from the group consisting of hydrogen, an alkyl radical containing not more than 6 carbon atoms, an aryl radical, substituted aryl radicals and a halogen atom; and lanolin.

16. A method for modifying the growth of a plant which comprises applying to said plant in an amount and concentration sufficient to achieve the desired result 4-phthalimido-2,6-dimethylpyrimidine suspended in polyvinyl alcohol and water.

References Cited in the file of this patent
UNITED STATES PATENTS
2,556,664   Smith ------------------ June 12, 1951